United States Patent
Im

(10) Patent No.: US 8,195,314 B2
(45) Date of Patent: Jun. 5, 2012

(54) METHOD OF REPRODUCING PREVIOUS AUDIO FILE IN MULTIMEDIA DEVICE AND MULTIMEDIA DEVICE USING THE SAME

(75) Inventor: Jong Guk Im, Seoul (KR)

(73) Assignee: LG Electronics Inc., Seoul (KR)

( * ) Notice: Subject to any disclaimer, the term of this patent is extended or adjusted under 35 U.S.C. 154(b) by 1376 days.

(21) Appl. No.: 11/455,093

(22) Filed: Jun. 19, 2006

(65) Prior Publication Data

US 2006/0288289 A1 Dec. 21, 2006

(30) Foreign Application Priority Data

Jun. 20, 2005 (KR) .................. 10-2005-0053242

(51) Int. Cl.
*G06F 17/00* (2006.01)
(52) U.S. Cl. ........................................ 700/94
(58) Field of Classification Search .............. 700/94; 369/1–12
See application file for complete search history.

(56) References Cited

U.S. PATENT DOCUMENTS 6,388,960 B1 * 5/2002 Furukawa et al. ......... 369/30.24

FOREIGN PATENT DOCUMENTS

JP 2003-85881 A 3/2003

* cited by examiner

*Primary Examiner* — Andrew C Flanders
(74) *Attorney, Agent, or Firm* — Birch, Stewart, Kolasch & Birch, LLP

(57) ABSTRACT

Provided is a method of reproducing a previous audio file in a multimedia device having a main memory and a hard disk drive. According to the method, when a user inputs a previous audio file reproduction command, whether the multimedia device is in an audio file reproducible state is determined. When the multimedia device is in the audio file reproducible state, previous audio file reproduction validity information stored in the main memory is checked and whether the previous audio file is reproducible is determined. After that, when the previous audio file is reproducible, previous audio file reproduction information is read from the hard disk drive, and whether the previous audio file exists in a relevant reproduction mode using a reproduction mode contained in the previous audio file reproduction information. Next, when the previous audio file exists in the relevant mode, a mode is switched, a relevant path is explored according to the previous audio file reproduction information, and the previous audio file is reproduced.

14 Claims, 3 Drawing Sheets

METHOD OF REPRODUCING PREVIOUS AUDIO FILE IN MULTIMEDIA DEVICE AND MULTIMEDIA DEVICE USING THE SAME

BACKGROUND OF THE INVENTION

1. Field of the Invention

The present invention relates to a method of reproducing again a previous audio file that has been reproduced and suspended recently in a multimedia device using only one key manipulation, and a multimedia device using the method.

2. Description of the Related Art

Up to now, home appliances such as television audio players, video players, computers, and cassette players, or electronic communication apparatus have been developed as a separate apparatus having a peculiar purpose and function of its own. However, as functions of the apparatus are combined and integrated, efforts have been made to achieve integration of a television and a video player, integration of an audio player and a cassette player, integration of a computer and an audio player, and integration of apparatuses (e.g., a television) for viewing.

Also, as video apparatuses achieve high performance and complexity, the video apparatuses are recently incorporating a general audio function therein. Furthermore, as an MP3 file becomes a standard of a digital audio file, it is possible to store and reproduce lots of audio files with low storage capacity. Also, it is possible to store and reproduce the audio files using a various kinds of memory cards as well as a CD-reader/rewritable (CD-R/RW) medium. A user desires to listen to an MP3 file as well as a musical piece contained in an audio compact disk (CD) through a home appliance and it is possible to reproduce an MP3 file using a various kinds of memory cards as well as a CD-R/RW medium. Also, it is possible to copy some of MP3 files on a built-in hard disk drive (HDD) to enable a user to listen to the MP3 files without an original medium.

According to a method of reproducing an audio file in a multimedia device of the related art, a medium containing a desired audio file is mounted in the multimedia device first, and a media mode is switched under an idle state. Here, the medium includes hard disk drives, memory cards, and digital versatile discs.

When the media mode is switched, a home menu is opened in the switched media mode. After that, when the multimedia device displays a screen containing an audio file list, a user selects a desired list from the displayed screen and explores a folder containing a desired audio file to select the desired audio file. Then, the multimedia device reproduces the audio file selected by a user.

However, when the audio file is reproduced through the above-described process, the required number of times of manipulation of a remote controller is three at the minimum. When the folder is more complicated, the number of times of manipulation of the remote controller increases even more.

SUMMARY OF THE INVENTION

An object of the present invention is to provide a method of reproducing a previous audio file in a multimedia device, capable of reproducing again an audio file that has been reproduced and suspended recently in the multimedia device when a user desires to listen to the audio file.

Another object of the present invention is to provide a method of reproducing a previous audio file in a multimedia device, capable of reproducing an audio file that has been reproduced recently even when the power of the multimedia device is turned off and turned on.

A further another object of the present invention is to provide a method of reproducing a previous audio file in a multimedia device, capable of finding out a previously reproduced audio file, entering an audio file list, and immediately reproducing the audio file by manipulating one key of a remote controller in no matter what state the multimedia device operates.

To achieve these objects, in one aspect of the present invention, there is provided a method of reproducing an audio file, the method including: inputting a previous audio file reproduction command; and reproducing a previous audio file with reference to previous audio file reproduction validity information and previous audio file reproduction information according to the input previous audio file reproduction command.

In another aspect of the present invention, there is provided a method of reproducing an audio file, the method including: inputting a previous audio file reproduction command; loading previous audio file reproduction validity information and previous audio file reproduction information stored in a memory onto a main memory; and judging the previous audio file reproduction validity information and previous audio file reproduction information to reproduce a previous audio file.

In a further another aspect of the present invention, there is provided a multimedia device including: a key input unit for inputting a previous audio file reproduction command; a memory unit for storing information regarding a previous audio file; and a controller controlling such that the previous audio file stored in the memory unit is reproduced according to signals from the key input unit.

DETAILED DESCRIPTION OF THE INVENTION

The preferred embodiments of the present invention will be described in detail with reference to the accompanying drawings.

Figure 1:
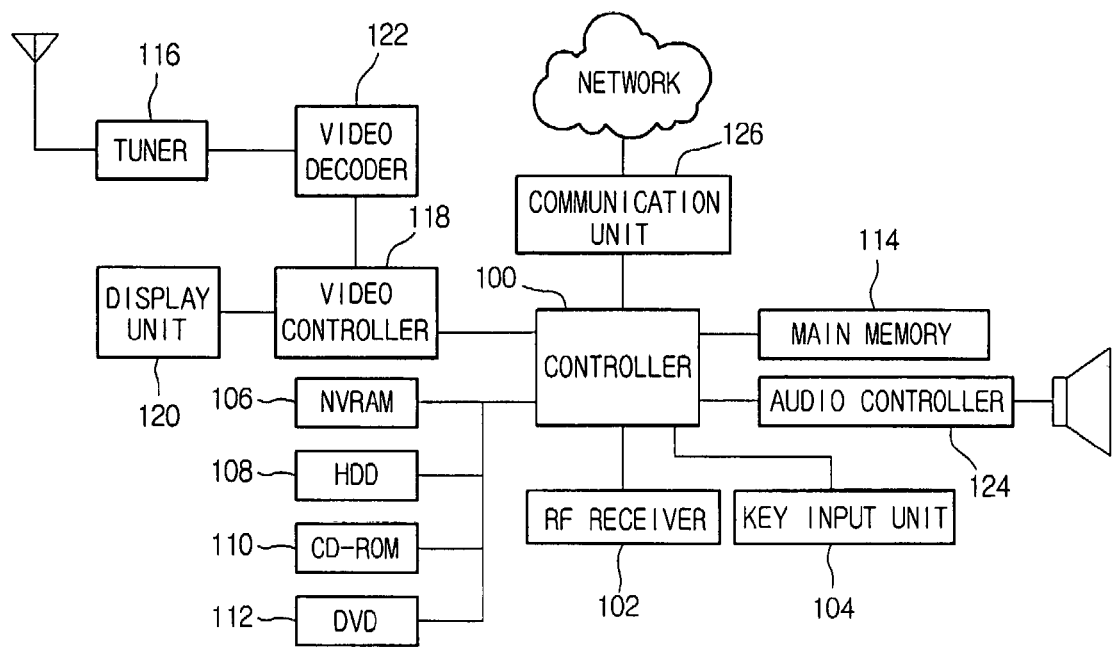
FIG. 1 is a schematic block diagram illustrating a construction of a multimedia device according to the present invention.

FIG. 1 is a schematic block diagram illustrating a construction of a multimedia device according to the present invention.

The multimedia device is a device that integrates a computer, an Internet television, an Internet radio, a general television and a digital television, a telephone function, an audio function, and a video function and connects the functions one another to provide a new composite function and a simultaneous performance function.

Referring to FIG. 1, the multimedia device includes a controller 100, an radio frequency (RF) receiver 102, a key input unit 104, a non-volatile random access memory (NVRAM) 106, a hard disk drive (HDD) 108, a main memory 114, a tuner 116, a video controller 118, a display unit 120, a video decoder 122, an audio controller 124, and a communication unit 126.

The multimedia device may be used as a television and an audio device.

The video decoder 122 of the multimedia device receives broadcasting signals or video cassette recorder (VCR) signals through the tuner 116 to convert the received signals into digital signals. The converted signals are outputted to the display unit 120 under control of the video controller 118.

The video controller 122 is connected with the controller 100 through the video controller 118 to convert audio signals and video signals contained in television broadcasting signals or VCR signals received through the tuner 116 into digital signals. The converted video signals are outputted to the display unit 120 via the video controller 118.

Also, the multimedia device serves as an audio device. That is, the converted audio signals are outputted to an audio output unit (e.g., a speaker) via the controller 100 and the audio controller 124. The audio controller 124 is connected with the controller 100 via a bus to convert digital audio data into analog audio signals, or convert analog audio signals into digital audio data. The audio controller 124 may store sound sources therein. The sound sources may be stored in a separate chip (not shown), which may output required sound sources under control of the audio controller 124.

Also, the audio controller 124 receives digital audio data from other devices through the communication unit 126 or a storage device including the hard disk drive 108 to store audio signals in a magnetic tape recording device or a CD-ROM.

When a previous audio file reproduction command is inputted through the key input unit 104, the controller 100 determines whether the multimedia device can operate as an audio device. Here, the key input unit 104 may be provided as a single key input unit to the multimedia device, may be provided as a key unit for exclusive use in a remote controller, may be provided through an on-screen-display (OSD), or may be provided as a combination of these key input units.

When the multimedia device can operate as an audio device as a result of determination, the controller 100 reads previous audio file information from the hard disk drive 108 and determines whether a relevant audio file exits on a position from which the information has been read. When the relevant audio file exists on the position as a result of the determination, the controller 100 switches a mode according to the previous audio file information and moves to a relevant path to control a relevant audio file to be reproduced.

Also, when a medium reproduced recently is detached from the multimedia device (e.g., a CD being reproduced recently is replaced or a memory card is ejected), the controller 100 resets a recent reproduction state.

A method of reproducing an audio file using the multimedia device having the above construction will be now be described with reference to FIG. 2.

Figure 2:
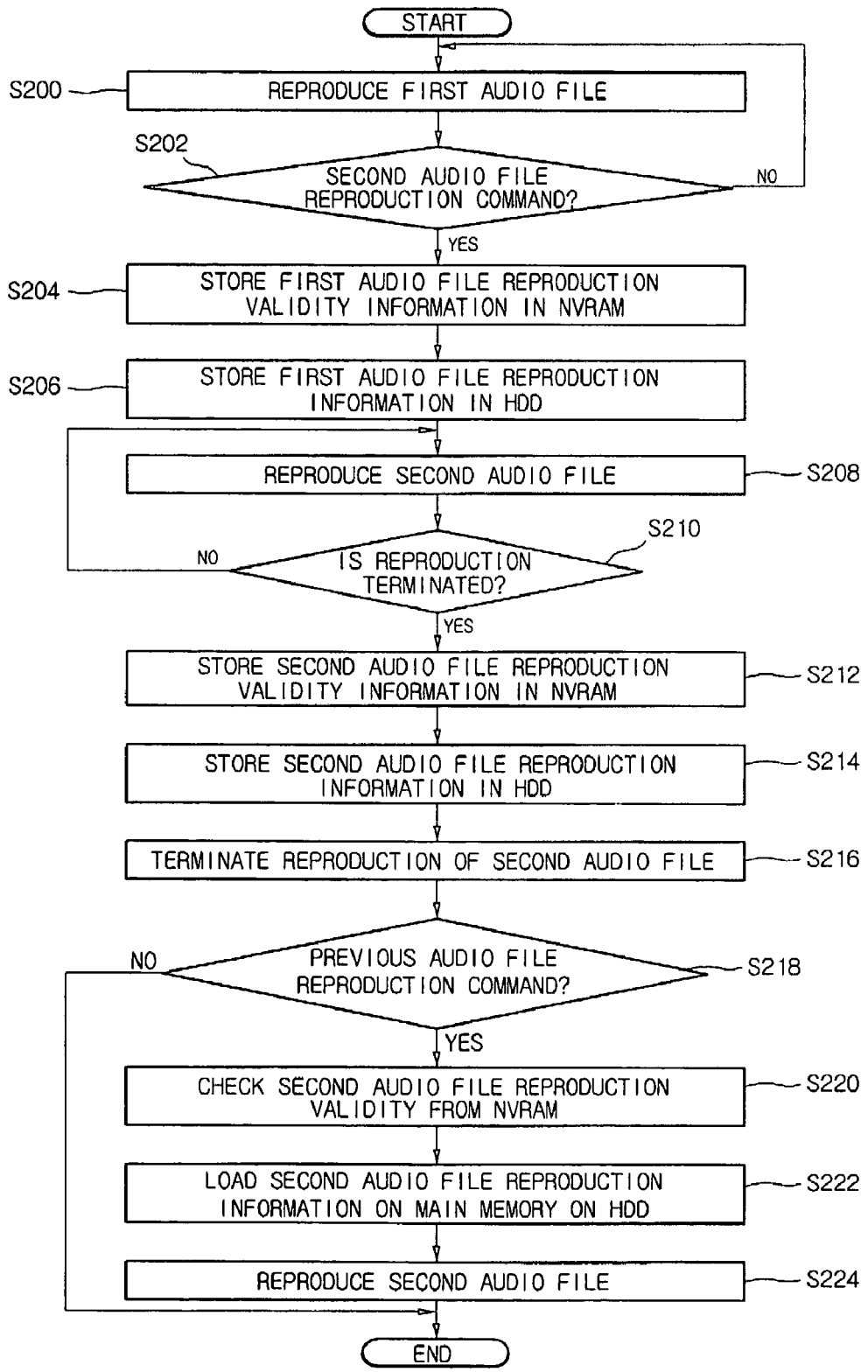
FIG. 2 is a flowchart illustrating a method of setting and storing previous audio file validity and previous audio file information to reproduce an audio file in a multimedia device according to the present invention.

FIG. 2 is a flowchart illustrating a method of reproducing an audio file using an audio file list in a multimedia device according to the present invention. FIG. 2 mainly illustrates a previous setting process of reproducing a second audio file when a second audio file reproduction command is inputted again as a single key command after reproduction of a first audio file, reproduction of a second audio file, and termination of the second audio file.

When a second audio file reproduction command is inputted through the key input unit 104 (S202) while the multimedia device currently reproduces a first audio file (S200), the controller 100 controls the audio controller 124 to suspend the first audio file currently being reproduced, stores first audio file reproduction validity information in a non-volatile random access memory 106 (S204), and store first audio file reproduction information in the hard disk drive 108 (S206).

After that, the controller 100 transmits a second audio file reproduction command to the audio controller 124 to allow the second audio file to be reproduced.

Here, the first audio file reproduction validity information is information as to whether a tray of a CD-ROM or a CD-R/RW that has recently operated has been opened, or whether a memory card that has been recently used for a reproduction operation has been ejected. Also, the first audio file reproduction information includes a mode (e.g., a hard disk drive mode, a memory card mode, a CD-R/RW mode, and an audio CD mode) in which the first audio file is to be reproduced, an index of the first audio file, a path of the first audio file, and a filename of the first audio file. Also, the audio file reproduction validity information is stored in a size of 1 byte.

After an operation 206 is performed, the multimedia device reproduces the second audio file (S208).

When reproduction termination of the second audio file occurs due to power off while the audio file is reproduced (S210), the multimedia device stores reproduction validity information of the second audio for which reproduction is to be currently terminated in the non-volatile random access memory (S212). Then, the first audio file reproduction validity information stored in the non-volatile random access memory in the operation S204 is removed, and the second audio file reproduction information is stored in the hard disk drive (S214).

the first audio file reproduction validity information can be stored together with the second audio file reproduction information in the hard disk drive as reproduction history information. The stored reproduction history information is used as a list for reproduction depending on selection of a user. This list contains all of previous audio files. A user may enter this list of the previous audio files using a single key, and select one of the previous audio files contained in the list to immediately reproduce the selected previous audio file using the single key.

When reproduction of the second audio file is terminated in a next operation S216 and the power is turned on or a previous audio file reproduction command is inputted (S218), the multimedia device loads the second audio file reproduction validity information stored in the non-volatile random access memory on a main memory to check the loaded information (S220). Also, the hard disk drive loads the second audio file reproduction information on the main memory (S222) to reproduce the second audio file (S224).

Also, a time point at which the second audio file reproduction validity information is stored in the non-volatile random access memory in the operation S214 is a time point at which a power button of a remote controller or a front board is pressed. A time point at which the reproduction validity information is read from the non-volatile random access memory and loaded on the main memory is a time point at which the power of the multimedia device is on and booted.

That is, the previous audio file reproduction validity information and previous audio file reproduction information are stored when a reproduction command for another audio file is input or a power-off command is input, and the previous audio file reproduction validity information and previous audio file reproduction information are loaded onto the main memory when a power-on command is input or a reproduction command for previous audio file is input.

Since the non-volatile random access memory has a very small capacity, the non-volatile random access memory writes only 1 byte for determining validity of previous audio file information. Previous audio file information having larger capacity is stored in a hidden file on the hard disk drive. The non-volatile random access memory is also provided against power off.

Figure 3:
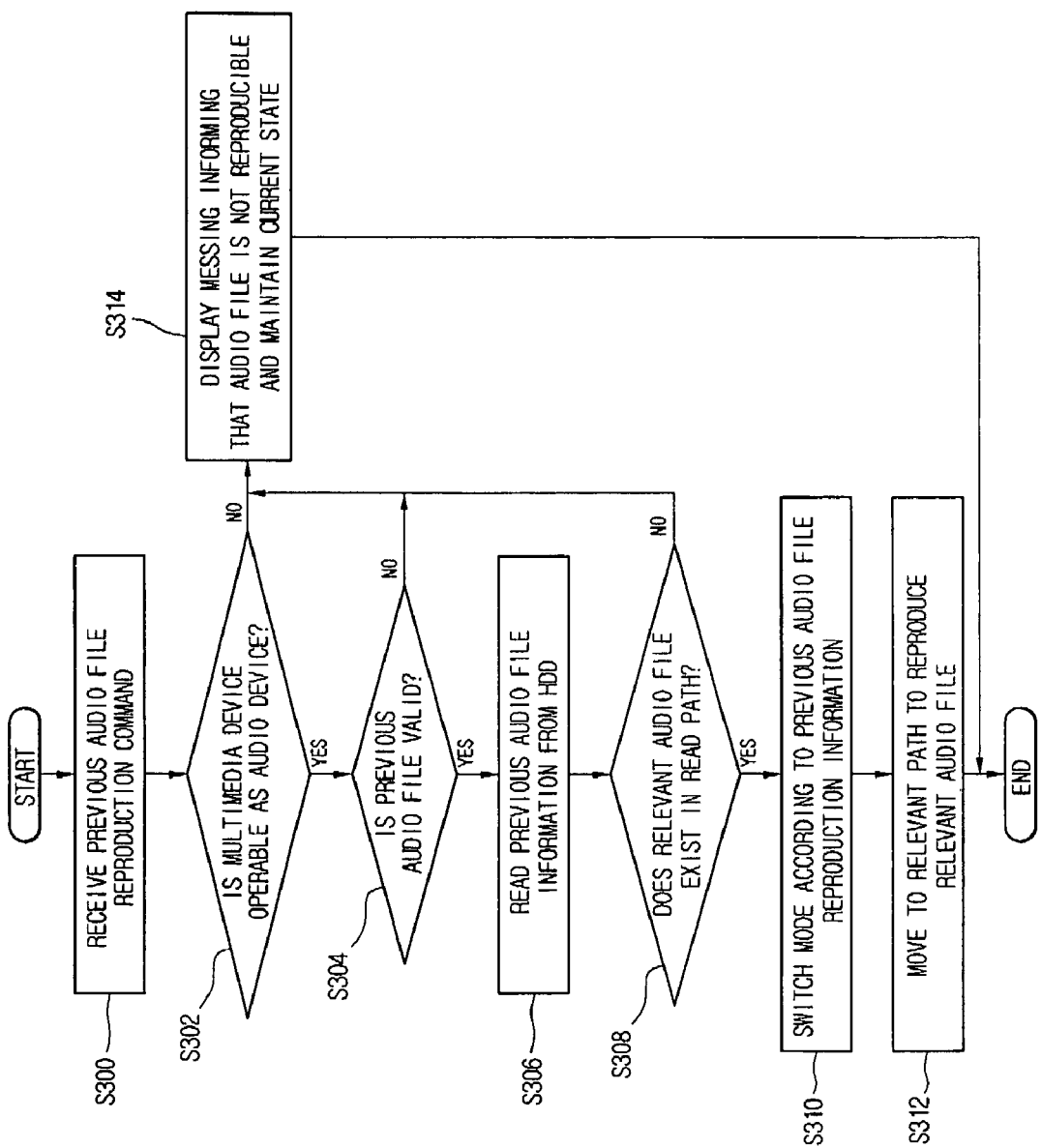
FIG. 3 is a flowchart illustrating a method of reproducing a previous audio file using a hot-key in a multimedia device according to the present invention.

FIG. 3 is a flowchart illustrating a method of reproducing a previous audio file using a hot-key in a multimedia device according to the present invention. The process of FIG. 3 illustrates in more detail a process after previous setting has been performed already (i.e., after the operations S204 through S214 of FIG. 2 have been completed in the multimedia device). The process of FIG. 3 generalizes in more detail the operations S216 through S224 of FIG. 2.

Referring to FIG. 3, when a user inputs a previous audio file reproduction command using a hot-key or a menu key, the multimedia device receives the previous audio file reproduction command inputted by a user (S300).

When the previous audio file reproduction command is inputted from a user, the multimedia device determines whether the multimedia device is in an audio file reproducible state (S302). That is, the multimedia device determines whether the multimedia device is operable as an audio device.

When the multimedia device is operable as the audio device as a result of the determination, the multimedia device checks previous audio file reproduction validity to determine whether a previous audio file is reproducible (S304).

That is, when the multimedia device is operable as the audio device, the multimedia device checks the previous audio file reproduction validity information stored in the non-volatile random access memory to determine whether a previous audio file is reproducible. Since the non-volatile memory stores the reproduction validity information representing whether the previous audio file is reproducible, the multimedia device determines whether the previous audio file is reproducible using the reproduction validity information. Also, the previous audio file validity information is remained in the non-volatile memory even when the power is turned on again after being turned off, conditions required for determining information as to reproduction of the previous audio file are still provided. When an audio file has been recently reproduced using the CD-ROM and a tray of the CD-ROM is opened, or when an audio file has been recently reproduced using a memory card and the memory card is ejected, a validity test as to the reproduction of an audio file represents invalidity of the reproduction of the audio file. Accordingly, the previous audio file reproduction information is reset.

When the previous audio file is reproducible as a result of the determination in the operation S304, the multimedia device reads previous audio file reproduction information from the hard disk drive (S306). Here, the previous audio file reproduction information includes a mode (e.g., a hard disk drive mode, a memory card mode, a CD-R/RW mode, and an audio CD mode) in which the previous audio file is to be reproduced, an index of the previous audio file, a path of the previous audio file, and a filename of the previous audio file.

After that, whether a relevant audio file that matches with the previous audio file reproduction information exists in a relevant path is determined (S308). For example, when a reproduction mode contained in the previous audio file reproduction information is an audio CD mode, the multimedia device determines whether a relevant CD containing the previous audio file is inserted in a CD-R, and whether an audio file for reproducing the previous audio file is contained in the CD, or whether the audio file is stored in a predetermined location on the hard disk drive on the basis of a path of the previous audio file.

By doing this, the multimedia device may cope with a case where a last reproduced audio file is deleted after the audio file is reproduced, so that the audio file is not reproducible any more, or where an audio file is not found because a name of a folder containing the audio file has been changed even though the audio file is not deleted.

When the previous audio file does not exist on the path that matches with the previous audio file reproduction information as a result of the determination of the operation S308, the multimedia device displays a message informing that the audio file is not reproducible and maintains a current state (S314).

Also, when the multimedia device is not operable as an audio device as a result of the determination in the operation S302, the multimedia device performs the operation S314.

When the previous audio file is not reproducible as a result of the determination in the operation S304, the multimedia device performs the operation S314.

As described above, the multimedia device may immediately reproduce the previous audio file recently reproduced using a single hot-key.

With the above construction, the present invention has the following effects.

First, after the multimedia device suspends an audio file that has been reproduced recently, the multimedia device may immediately reproduces the audio file using a remote controller's key once.

Second, according to the present invention, it is possible to immediately reproduce a recently reproduced audio file through one time of key manipulation even though the power of the multimedia device is turned on after being tuned off.

Third, it is possible to make all of the previous audio file reproduction information and previous audio file reproduction validity information stored in the hard disk drive as a list and to immediately reproduce a desired previous audio file contained in the list through single key manipulation.

It will be apparent to those skilled in the art that the present invention is not limited to the above embodiments but various modifications and variations can be made within the spirit of the present invention.

What is claimed is:

1. A method of reproducing an audio file, the method comprising:
   inputting a previous audio file reproduction command;
   checking previous audio file reproduction validity information stored in a non-volatile memory to determine whether a previous audio file is reproducible;
   reading previous audio file reproduction information from a hard disk drive and determining whether the previous audio file exists in a reproduction mode contained in the previous audio file reproduction information; and
   switching a device reproduction mode to the reproduction mode contained in the previous audio file reproduction information, moving to a path of the previous audio file according to the previous audio file reproduction information, and loading the previous audio file into a main memory to reproduce the previous audio file according to the reproduction mode contained in the previous audio file reproduction information.

2. The method according to claim 1, wherein the previous audio file reproduction validity information is stored in a size of 1 byte.

3. The method according to claim 1, wherein the previous audio file reproduction information is inputted by a hot key.

4. The method according to claim 1, wherein the previous audio file reproduction information further comprises an index of the previous audio file, a path of the previous audio file, and a filename of the previous audio file.

5. A method of reproducing an audio file, the method comprising:

storing first audio file reproduction validity information in a non-volatile memory, when a second audio file reproduction command is inputted while a first audio file is reproduced;

storing second audio file reproduction information in a hard disk drive;

storing second audio file reproduction validity information in the non-volatile memory when a reproduction termination occurs while the second audio file is reproduced;

inputting a previous audio file reproduction command;

loading the second audio file reproduction information from the hard disk drive to a main memory; and reproducing the second audio file as a previous audio file using the second audio file reproduction information loaded in the main memory.

6. The method according to claim 5, further comprising:
when the second audio file is not in a reproducible state, displaying a message informing that the second audio file is not reproducible.

7. The method according to claim 5, wherein the second audio file reproduction validity information and second audio file reproduction information are stored when a reproduction command for another audio file is input or a power-off command is input.

8. The method according to claim 5, wherein the second audio file reproduction validity information and second audio file reproduction information are loaded onto the main memory when a power-on command is input.

9. The method according to claim 5, wherein the second audio file reproduction validity information is stored in a size of 1 byte.

10. A multimedia device, comprising:
a key input unit for inputting a previous audio file reproduction command;
a memory unit for storing a previous audio file and information regarding the previous audio file; and
a controller controlling such that the previous audio file stored in the memory unit is reproduced according to signals from the key input unit,
wherein the information regarding the previous audio file comprises previous audio file reproduction validity information and previous audio file reproduction information,
wherein the previous audio file reproduction information includes a previous audio file reproduction mode indicating a medium storing the previous audio file and the previous audio file reproduction validity information is determined depending on whether the medium storing the previous audio file is detached or not before receiving the previous audio file reproduction command, and
wherein the memory unit comprises a non-volatile memory storing the previous audio file reproduction validity information, and a hard disk drive storing the previous audio file reproduction information.

11. The multimedia device according to claim 10, wherein the previous audio file reproduction validity information is stored in a size of 1 byte on the non-volatile memory.

12. The multimedia device according to claim 10, wherein the previous audio file reproduction validity information and previous audio file reproduction information are stored when a power-off command is input.

13. The multimedia device according to claim 10, wherein the previous audio file reproduction validity information and previous audio file reproduction information are stored when a reproduction command for another audio file is input.

14. The method according to claim 1, wherein the previous audio file reproduction validity information and previous audio file reproduction information are stored when a power-off command is input.

* * * * *